United States Patent
Mess et al.

(10) Patent No.: US 7,892,639 B2
(45) Date of Patent: Feb. 22, 2011

(54) TAMPER INDICATING LABELS WITH EDGE INGRESS SOLVENT-INDICATING FEATURE

(75) Inventors: Steven H. Mess, Franklin, WI (US);
Matthew Kasper, Oak Creek, WI (US);
Michael D. Savagian, Germantown, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 138 days.

(21) Appl. No.: 11/956,627

(22) Filed: Dec. 14, 2007

(65) Prior Publication Data

US 2008/0145611 A1 Jun. 19, 2008

Related U.S. Application Data

(60) Provisional application No. 60/870,271, filed on Dec. 15, 2006, provisional application No. 60/885,710, filed on Jan. 19, 2007.

(51) Int. Cl.
*B32B 7/12* (2006.01)
*B42D 15/00* (2006.01)

(52) U.S. Cl. ............ 428/354; 428/40.1; 428/41.8; 428/343; 428/913; 428/916; 283/94; 283/96; 283/97

(58) Field of Classification Search ............ 283/96, 283/97, 94, 107; 428/195.1, 199, 201, 203, 428/211, 913
See application file for complete search history.

(56) References Cited

U.S. PATENT DOCUMENTS

| | | | |
|---|---|---|---|
| 3,675,654 A | 7/1972 | Baker et al. | |
| 4,049,121 A | 9/1977 | White | |
| 4,212,393 A | 7/1980 | Lenkoff | |
| 4,515,863 A * | 5/1985 | Caines | 428/480 |
| 4,837,061 A | 6/1989 | Smits et al. | |
| 4,895,567 A | 1/1990 | Colon et al. | |
| 4,994,314 A | 2/1991 | Rosenfeld et al. | |
| 5,066,711 A | 11/1991 | Colon et al. | |
| 5,135,262 A | 8/1992 | Smith et al. | |
| 5,389,426 A | 2/1995 | Arens et al. | |
| 5,411,295 A * | 5/1995 | Bates et al. | 283/81 |
| 5,660,925 A | 8/1997 | Cooley et al. | |
| 5,770,283 A | 6/1998 | Gosselin et al. | |
| 6,653,522 B1 | 11/2003 | Blumenthal et al. | |
| 7,105,225 B2 | 9/2006 | Birkholz et al. | |
| 2005/0019519 A1* | 1/2005 | Guo et al. | 428/40.1 |
| 2005/0118415 A1* | 6/2005 | LaBrosse et al. | 428/349 |
| 2007/0207295 A1 | 9/2007 | Lu et al. | |

* cited by examiner

*Primary Examiner*—Callie E Shosho
*Assistant Examiner*—Nicholas Kokkinos
(74) *Attorney, Agent, or Firm*—Whyte Hirschboeck Dudek SC (57) ABSTRACT

Multi-layer, edge ingress, tamper- and solvent-indicating labels comprise a top film layer coated over a solvent, e.g., water, hydrocarbon, etc., and dye absorbing layer. The solvent and dye absorbing layer can be on top of a porous layer comprising a binder, pigment and particles of a solvent-soluble dye. The porous layer can be on top of an edge-wicking layer which itself is on top of a pressure-sensitive adhesive (PSA) layer. The edge-wicking layer both absorbs and transports solvent thus serving as a means for transporting solvent to the solvent-soluble dye.

9 Claims, 6 Drawing Sheets

TAMPER INDICATING LABELS WITH EDGE INGRESS SOLVENT-INDICATING FEATURE

CROSS-REFERENCE TO RELATED APPLICATIONS

This application claims the benefit of U.S. provisional application Nos. 60/870,271 and 60/885,710 filed Dec. 15, 2006 and Jan. 19, 2007, respectively.

FIELD OF THE INVENTION

This invention relates to labels. In one aspect, the invention relates to tamper-evident labels while in another aspect, the invention relates to tamper-evident labels with an edge ingress solvent-indicating feature. In still another aspect, the invention relates to an electronic device bearing a tamper-evident label with an edge ingress solvent indicating feature while yet in another aspect, the invention relates to a method of visibly recording the exposure of an electronic device to solvent.

BACKGROUND OF THE INVENTION

Solvents, i.e., liquid water and/or organic such as a hydrocarbon or halogenated hydrocarbon, e.g., gasoline, turpentine, chloroform, perchloroethylene, etc., can readily damage electronic devices such as laptop computers, cell phones and personal digital assistants. Accordingly, a need exists for a label or other device to indicate whether or not an electronic device has been subjected to contact with a solvent, at least sufficient solvent to void a product warranty. This need is filled to some extent by various commercially available, single-purpose labels with a format as described in FIG. 1.

Figure 1:
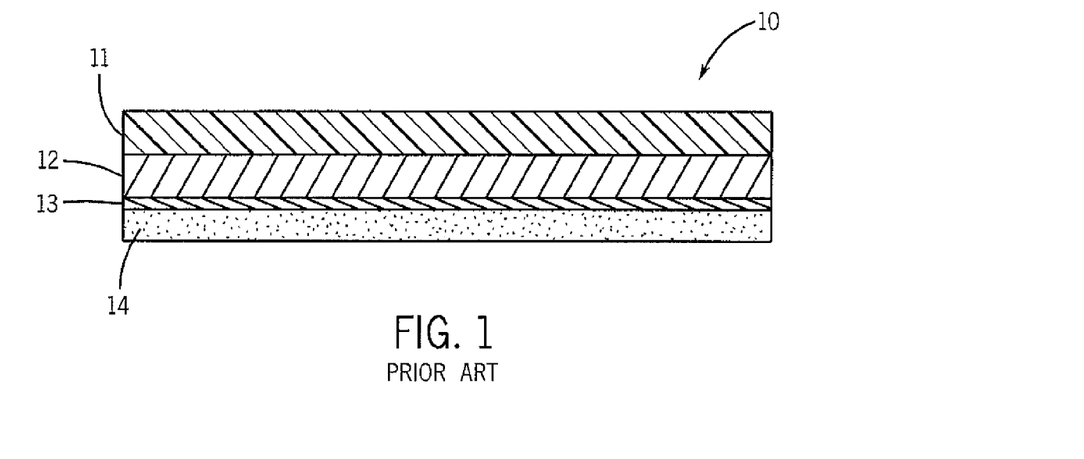
FIG. 1 is a schematic cross-sectional view of a single-purpose water-indicating label known in the art.

As shown in FIG. 1, solvent (here water) indicating label 10 comprises four layers. First or top layer 11 is typically a water-impervious clear plastic film, e.g., a clear polyester film, overlying water-absorbent paper layer 12. Underlying layer 12 is a layer of water-soluble ink (or dye) 13 which itself overlays a pressure sensitive adhesive layer 14. The water-soluble ink is not visible through the paper until wetted.

Water enters the structure from an edge surface of the label, not a face surface or in other words, the structure is an edge ingress label. If an edge surface of the label comes in contact with liquid water, then water will wick along the paper layer dissolving the water-soluble ink beneath the paper layer. The paper layer will absorb the solubilized ink, and the ink will become visible to an observer. The clear plastic film protects the label and keeps dissolved ink from seeping to the surface of the label and contaminating the electronic device and/or marking the user's person or clothing. If, of course, an organic solvent-soluble ink replaces the water-soluble ink, then this label will detect and report contact of the label with the organic solvent, not water.

While these single-purpose labels perform as designed, a strong interest in the electronic device industry exists for a label that can perform more. For example, an unscrupulous person could remove an activated water-indicating label from a device that has been in contact with liquid water, and replace it with an unactivated water-indicating label. One label that had both water- and tamper-indicating features could report such activity. The use of separate labels for each function would not report such activity and in any event, surface space on many electronic devices is limited thus making a dual or multi-purpose label more desirable than two or more separate labels.

One approach to a dual purpose label is to attach a small solvent-indicating label to a larger tamper-indicating label, but this approach has several drawbacks. First, the solvent-indicating label takes space on an already small label, and that space could be better used for printed information, e.g., a bar code. Second, a roll of labels with non-uniform thickness is difficult to roll uniformly. Third, the thicker portion of the label creates difficulties if print is imparted to the label using thermal transfer printing. Fourth, such a label with another label creates a very thick profile and interferes with efficient packing of a battery and other components into a thin electronic device.

Better solutions and improved formats are desired for an effective label that possesses both tamper- and solvent-indicating features.

SUMMARY OF THE INVENTION

In one embodiment, the invention is a multi-layer, edge ingress, tamper- and solvent-indicating label comprising a top film layer coated over a solvent and dye absorbing layer. In one mode of this embodiment, the solvent and dye absorbing layer is on top of a porous layer comprising a binder, pigment and particles of a solvent-soluble dye. This porous layer is on top of an edge-wicking layer which itself is on top of a pressure-sensitive adhesive (PSA) layer. The edge-wicking layer both absorbs and transports solvent thus serving as a means for transporting solvent to the solvent-soluble dye. In another mode of this embodiment, the edge-wicking layer is combined with the PSA layer. In another mode of this embodiment, the edge-wicking layer is replaced with hydrophilic fibers or other like materials that are laminated onto a pigment/dye/PSA layer to provide the label with significant edge-wicking capability. Still another mode of this embodiment is to replace the edge-wicking layer with channels or texturing between the PSA layer and the absorbent layer such that water can pass from outside the label to the absorbent layer.

In another embodiment, the invention is an edge ingress, multi-layer tamper- and solvent-indicating label comprising (i) a top film layer which is coated over and in contact with (ii) a solvent and dye absorbing layer which is coated over and in contact with (iii) a porous layer comprising a binder, pigment and particles of a solvent-soluble dye which is coated over and in contact with (iv) a PSA layer comprising openings that allow for the transport of solvent from outside the label to the porous layer comprising the solvent-soluble dye.

In another embodiment, the invention is an edge ingress, multi-layer tamper- and solvent-indicating label comprising (i) a clear, cast printable film layer which is over and in contact with (ii) a glass cloth layer which is over and in contact with (iii) a printed release layer which is over and in contact with (iv) a pigmented PSA with a solvent-soluble hidden dye layer which is over and in contact with (v) a protective carrier liner layer. The printed release layer is not in contact with the entire surface of the glass cloth layer such that the printed release layer forms a pattern on glass cloth layer. Those areas of the glass cloth layer not in contact with the printed release layer are in contact with the PSA layer.

In another embodiment, the invention is an edge ingress, multi-layer tamper- and solvent-indicating label comprising (i) a top film layer which is over and in contact with (ii) a clear PSA layer which is over and in contact with (iii) an ink layer comprising a solvent-soluble dye in a dispersed binder, and which is over and in contact with (iv) an absorbent layer which is over and in contact with (v) a PSA layer. The ink layer is not co-extensive with the two layers to which it is immediately adjacent, and it is positioned inward from the edge of the label edge to protect the solvent-soluble dye from high humidity. Variations on this label structure include one or more of (i) incorporating a pigment into the ink layer, (ii) an additional ink layer for masking indicia until exposed to solvent, and (iii) a layer of dye developer.

In another embodiment, the invention is an edge ingress, multi-layer tamper- and solvent-indicating label comprising (i) an optional printable coating layer which is over and in contact with (ii) a clear film layer which is over and in contact with (iii) an adhesive layer that can be pigmented, translucent or transparent and is over and in contact with (iv) a patterned hiding ink layer which is over and in contact with (v) a hidden solvent-indicating ink layer which is over and in contact with (vi) an absorbent, e.g., paper, layer which is over and in contact with (vii) a pressure sensitive adhesive layer which is over and in contact with (viii) an optional protective liner. The patterned hiding ink layer is not in contact with the entire surface of adhesive layer (iii) such that areas of the patterned hiding ink layer are in contact with the absorbent paper. Similarly, the hidden solvent-indicating ink layer is not in contact with the entire surface of the patterned hiding ink layer such that areas of the patterned hiding ink layer are also in contact with the absorbent paper.

In another embodiment, the invention is an edge ingress, multi-layer tamper- and solvent-indicating label comprising (i) a printable top film layer which is laminated to (ii) a solvent-indicating strip. Variations on this label construction include including pigment in the strip, (iii) clear and pigmented PSA layers in contact with both the top film layer and the strip, and (iv) replacing the strip with solvent-indicating indicia.

In another embodiment, the invention is an electronic device bearing an edge ingress, tamper- and solvent-indicating label of one of the preceding embodiments. In another embodiment, the invention is a method of recording an event in which an electronic device is brought into contact with solvent, the method comprising the step of applying a tamper- and solvent-indicating label of one of the preceding embodiments to the electronic device before the device is in contact with solvent.

DETAILED DESCRIPTION OF THE PREFERRED EMBODIMENTS

"Tamper-indicating label", "tamper-evident label" and like terms mean a label that provides evidence that the label was removed, or an attempt was made to remove the label, from the substrate to which it was attached. The evidence is usually visible to the unaided human eye, and the evidence can be on the substrate, label or both.

"Solvent-indicating label", "solvent-evident label" and like terms mean a label that provides evidence that it was in contact with a solvent. The evidence is usually visible to the unaided human eye, and the evidence is typically confined to the label itself.

"Tamper- and solvent-indicating label" and like terms mean that a label provides evidence that it was removed, or an attempt was made to remove it, from a substrate, and that it provides evidence that it was in contact with a solvent.

"Edge ingress label", "edge ingress, multi-layer tamper- and solvent-indicating label" and like terms mean a label into which solvent enters primarily, if not exclusively, through an edge surface. Edge ingress is used in distinction to planar (or facial or top) ingress in which solvent enters the label primarily, if not exclusively, through a planar surface.

"Solvent-soluble" and like terms mean that a material, e.g., dye, ink, etc., will at least partially dissolve, i.e., enter solution, in a solvent (e.g., water, or an organic compound, or a mixture of water and an organic compound such as water and an alcohol).

"Solvent" and like terms mean a substance that is capable of dissolving another substance (i.e., a solute) to form an essentially uniformly dispersed mixture (i.e., solution) at the molecular or ionic size level. Solvents include water and organic compounds. In the context of this invention, the solvents are typically liquid but can be a gas, e.g., steam.

"Organic solvent" and like terms mean a solvent other than water, e.g., a hydrocarbon or oxygenated or halogenated hydrocarbon such as gasoline, turpentine, chloroform, perchloroethylene, acetone, alcohol and the like.

"Dye" and like terms mean a visible light absorbing compound that is present in a molecularly dispersed (dissolved) form.

"Ink" and like terms mean a coatable or printable formulation containing a dye and/or pigment.

"Pigment" and like terms mean a visible light absorbing material or compound that is present in a non-molecularly dispersed (particulate) form.

"Binder" and like terms mean a film- or matrix-forming material in which dye or pigment particles are dispersed. Usually these materials are solvent polymers that exhibit adhesive properties towards fillers, dyes, pigments and the like. Representative of these materials are drying or mineral oils, and polymeric substances such as alkyd resins, acrylates and methacrylates, polyvinyl alcohol, ethyl vinyl acetate, etc.

"Planar surface", "facial surface", "top surface", "bottom surface" and the like are used in distinction to "edge surface". If rectangular in shape or configuration, a label will comprise two opposing planar surfaces joined by four edge surfaces (two opposing pairs of edge surfaces, each pair intersecting the other pair at right angles). If circular in configuration, then the label will comprise two opposing planar surfaces joined by one continuous edge surface. The labels can be of any size and shape and as such, so can the planar and edge surfaces, e.g., thin or thick, polygonal or circular, flat or wavy, etc.

The invention is described generally with reference to the drawings for the purpose of illustrating the certain embodiments only, and not for the purpose of limiting the scope of the invention. In the drawings like numerals are used to designate like parts throughout the same.

The embodiments described by the drawings are in the context of tamper- and water-indicating labels. Each of these embodiments can be altered to be tamper- and organic solvent-indicating labels by replacing the water-soluble components with organic solvent-soluble components, and the organic solvent-soluble components with water-soluble components. Those components that are impervious to water, e.g., the top film layer, the pressure sensitive adhesive, etc., are replaced with components that are either impervious to organic solvents or impervious to both water and organic solvents.

Figure 2A:
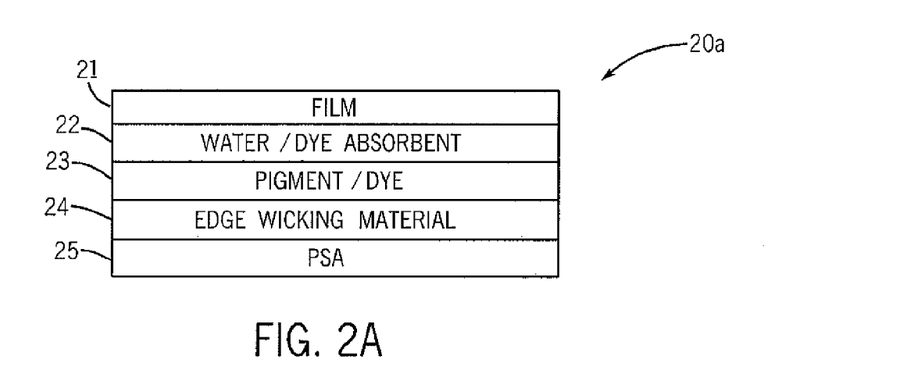
FIG. 2A is a schematic cross-sectional view of a five-layer tamper- and water-indicating label comprising layers of film, water and dye absorbent, a mixture of pigment and hidden dye, edge-wicking material, and PSA.

FIG. 2A is a schematic of five-layer tamper- and water-indicating label 20a comprising top film layer 21 overlain on water and dye absorbent layer 22. The film of layer 21 is typically clear or translucent, and it can be constructed from any material, e.g., polyester that will block the bleeding of the water-soluble dye of layer 23 once it has contacted liquid water and it has moved into water and dye absorbent layer 22. This absorbing layer can be constructed of any material that will receive and hold the dissolved dye, e.g., paper, cellulosic fibers, etc. Pigment and dye layer 23 has a porous composite of binder, pigment and dye. The amount of pigment does not have to be, although it can be, in excess of the critical binder/pigment ratio. The dye is present as water-soluble particles dispersed throughout the layer.

The critical pigment to binder ratio is that ratio at which there is just enough volume of binder to fill all of the space between pigment particles such that any additional pigment results in void formation. The presence of this excess non-water soluble pigment in the composition renders the composition porous to liquid water. Typically, the excess non-water soluble pigment is present in the composition on a volume percent (vol %) basis, based on the volume of the binder, of at least 50, preferably at least 65 and more preferably at least 75, vol %. The water-soluble dye or pigment particles are present at a fairly low concentration, e.g., typically at a wt % between 1 and 20, preferably between 2 and 10 and more preferably between 4 and 8, based on the weight of the composition. One or more dyeing assistants, e.g., sodium chloride or sodium sulfate, can also be used if desired.

The color of the dye and pigment can vary to convenience and depending upon the amount and color of the pigment, the dye can be hidden to some extent until wetted. Pigments can include but are not limited to silicas, aluminas, carbonates, clays, metals, metal oxides, glasses, and solid forms of dyes, polymers and any insoluble particulates. The porous composite is sufficiently porous that water can quickly enter, yet sufficiently thin that the underlying tamper-indicating features remain operational.

The water-soluble dye or pigment is present in dispersed or particulate form. The pigment or particles are typically smaller than 100, preferably less than 50, microns to minimize visibility. Upon contact with water, the particles dissolve and the dye "blooms" thus becoming highly visible. If the dye in particulate form is too intense such that its color is objectionable, this can be moderated by adding a complementary colorant such that the color of the dye is muted or "greyed-out" until activated upon contact with water. For example, a colorant selected to give a red color upon contact with water may impart a pink color to absorbent 22. If a pale green colorant, e.g., dye, pigment, ink, is included in layer 23, then the observed color is of a more neutral hue.

Layer 24 comprises an edge-wicking material, typically a highly absorbent paper or paper composite, that is laminated or otherwise in intimate contact with pigment/dye layer 23. To the underside of layer 24 is laminated or otherwise applied PSA layer 25 which itself can be in intimate contact with a protective release layer (not shown).

In operation, label 20a is applied to the surface of a substrate, e.g., an electronic device, such that it is held in place on the substrate surface by means of the PSA. If the substrate and label come in contact with water, then water will enter the label through the edge of layer 24, and the water will be transported to the interface between layers 24 and 23. The water will be absorbed into layer 23 in which it will dissolve the water-soluble dye particles, and this dissolved dye will migrate through layer 23 into absorbent layer 22. Once in layer 22, the dissolved dye will be visible to the unaided eye through clear or translucent film layer 21. Label 20a can be constructed by any one of a number of different methods including coating the various layers onto one another from appropriate vehicles, e.g., water- or solvent-borne, lamination (heat or otherwise), and various combinations of the two.

Figure 2B:
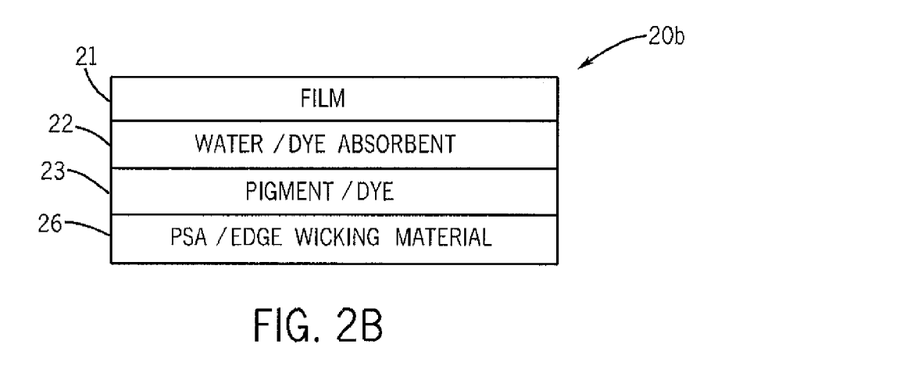
FIG. 2B is a schematic cross-sectional view of a four-layer tamper- and water-indicating label comprising layers of film, water and dye absorbent, a mixture of pigment and hidden dye, and a mixture of edge-wicking material and PSA.

Several variations exist on the construction of label 20a. One such variation is illustrated by FIG. 2B. Label 20b comprises four layers. Layers 21, 22 and 23 are essentially the same as layers 21, 22 and 23 in FIG. 2A. However, layer 26 of FIG. 2B is a combination of layers 24 and 25 of FIG. 2A. One construction of layer 26 is a tissue-supported transfer adhesive. In this embodiment, water is absorbed through the edge of layer 26, transported to layer 23 in which it dissolves the dye particles, and the dissolved dye migrates to absorbent layer 22 in which it is visible to an observer through film layer 21.

Figure 2C:
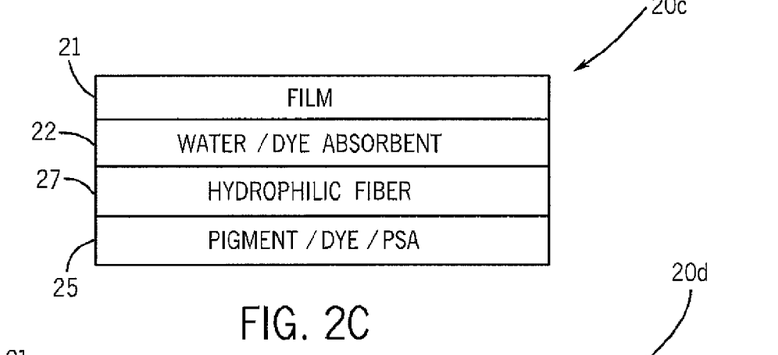
FIG. 2C is a schematic cross-sectional view of a four-layer tamper- and water-indicating label comprising layers of film, water and dye absorbent, hydrophilic fibers, and a mixture of pigment, hidden dye and PSA.

In another variation, label 20c of FIG. 2C comprises four layers of which layers 21 and 22 are essentially the same as layers 21 and 22 of FIG. 2A. However, layer 27 of FIG. 2C consists of hydrophilic fibers, e.g., cellulosic fibers, laminated to PSA layer 25. Sufficient hydrophilic fibers are laminated to PSA layer 25 such that upon contact with water, label 20c absorbs water through the edge of layer 27 by means of the fibers, the water dissolves the dye particles in layer 25, and the dissolved dye migrates to absorbent layer 22 in which it is visible to an observer through film layer 21.

Figure 2D:
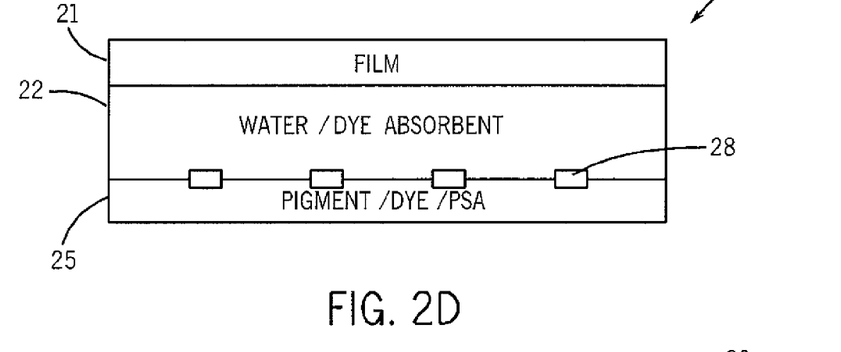
FIG. 2D is a schematic cross-sectional view of a three-layer tamper- and water-indicating label comprising layers of film, water and dye absorbent, and a mixture of pigment, dye and PSA, with channels or texturing between the water and dye adsorbent and pigment, dye and PSA mixture layers.

In another variation, label 20d of FIG. 2D comprises three layers of which layers 21 and 22 are essentially the same as layers 21 and 22 of FIG. 2A. However, label 20d does not have a layer 24, i.e., a layer comprising edge-wicking material. Rather, label 20d has a one or more, preferably a plurality, of channels 28 at the interface of layers 22 and 25 through which water can pass and enter pigment/dye/PSA layer 25. Once water enters layer 25, then it acts like it does in labels 20a-20c, i.e., it dissolves the dye particles or dispersed dye and the dissolved dye migrates to absorbent layer 22 in which it is visible to an observer through film layer 21. The channels can be created by any convenient method typically by texturing either or both the appropriate surfaces of layers 22 and 25. Texturing can be imparted to either or both surfaces by passing the surfaces beneath a textured roll on a process line.

Figure 2E:
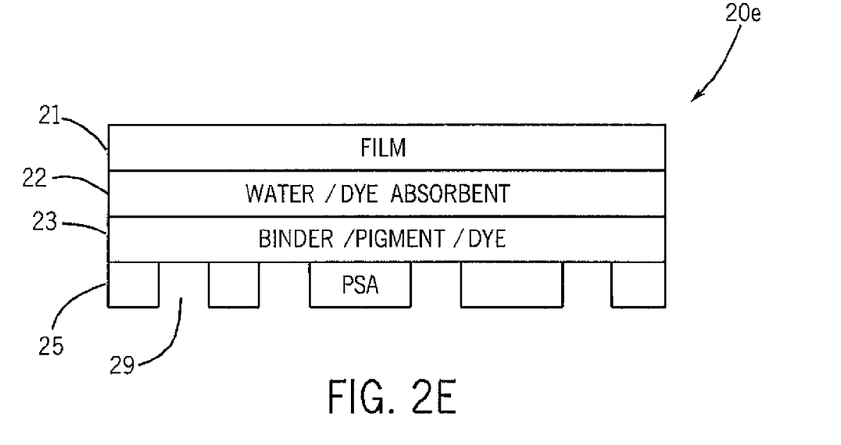
FIG. 2E is a schematic cross-sectional view of a four-layer tamper- and water-indicating label comprising layers of film, water and dye absorbent, a mixture of binder, pigment and hidden dye, and PSA, with channels or texturing in the PSA layer.

In another variation, label 20e of FIG. 2E comprises four layers of which layers 21, 22, 23 and 25 are essentially the same as layers 21, 22, 23 and 25 of FIG. 2A. However, label 20e does not have a layer 24, i.e., a layer comprising edge-wicking material. Rather, label 20e has a one or more, preferably a plurality, of channels or openings 29 in PSA layer 25 through which water can enter and pass through layer 25 and enter pigment/dye layer 23. Once water enters layer 23, then it acts like it does in labels 20a-20c, i.e., it dissolves the dye particles and the dissolved dye migrates to absorbent layer 22 in which it is visible to an observer through film layer 21. The channels or openings in PSA layer 25 can be created by any convenient method, typically by coating the PSA onto the bottom surface of layer 23 such that certain areas of the bottom surface of layer 23 are in open communication with the substrate surface (not shown) to which the label is attached, i.e., PSA is not present between these particular areas of surface of layer 23 and substrate. Texturing can be imparted to either or both surfaces by passing the surfaces beneath a textured roll on a process line. Channels 29 are open, of course, to the edge of label 20e so that water can ingress to layer 23.

The tamper-indicating feature of labels 20a-20e, and of the labels described in FIGS. 5A-5E, 6A-6B, 7 and 8, is typically one of two designs. One is designing frangibility into one or more of the layers such that upon an attempt to remove the label from its substrate, part of one or more layers remains on the substrate and the label itself is effectively destroyed in the context of re-use. The other uses a printed release pattern between layers that will break apart in a pattern after the label is well adhered to a surface after application.

Figure 3:
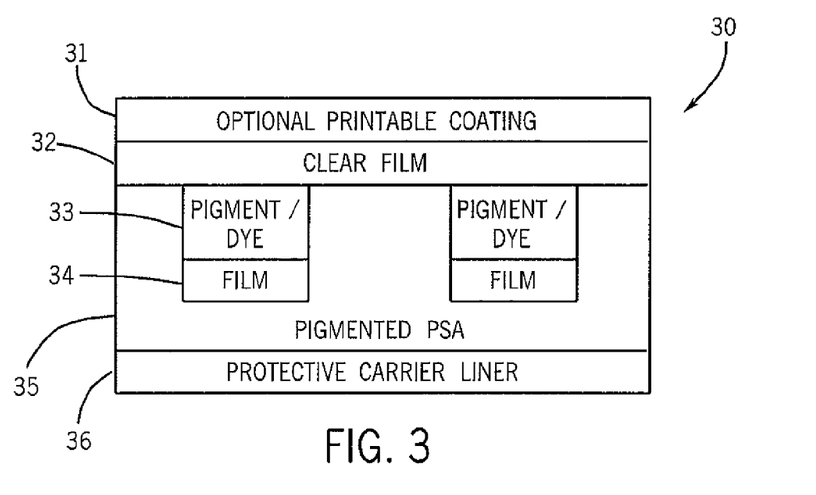
FIG. 3 is a schematic cross-sectional view of a six-layer tamper- and water-indicating label comprising layers of an optional printable coating, clear film, a mixture of pigment and water-soluble dye, a second film, pigmented PSA, and a carrier liner.

FIG. 3 is a schematic of six-layer tamper- and water-indicating label 30 comprising optional printable coating layer 31 overlain on clear or translucent film layer 32. If present, coating layer 31 can comprise any material that will accept an ink or other marking material from a printer or other marking device to record information on the surface of label 30. Film layer 32 is similar in composition and construction to film layer 21 of labels 20a-20e. Pigment/dye layer 33 is similar in composition and construction to pigment/dye layer 23 in labels 20a-20e except that it is limited to one or more strips that do not cover the entire surface of layer 32. Rather, these strips or other configurations are arranged, preferably in a pattern of one kind or another, to permit pigmented PSA layer 35 to be in direct surface contact with film layer 32 in one or more locations. Film layer 34 separates pigment/dye layer 33 from pigmented PSA layer 35. Protective carrier liner 36 protects PSA layer 35 until label 30 is ready for use.

The water-indicating feature of label 30 operates in a manner similar to labels 20a-20e. Water is wicked into the edge of layer 33 (or one or more channels at the interface of layers 32 and 33 or the interface of layers 33 and 34 (the channels not shown)) in which it dissolves the dye particles that thus bloom and become visible to an observer through film layer 32 and optional printable coating layer 31. Film layer 32 provides protection against dye bleeding onto the substrate to which label 30 is attached, and it provides a base onto which a printable coating can be applied to the label. Layer 33 is pigmented to hide the dye, and it is colored similarly to layer 35 which gives the label a background color.

One method of constructing label 30 is to coat layer 33 onto layer 34, slit this two-layer construction into narrow strips, e.g., 0.125 to 0.25 inches, and then to laminate the slits onto PSA layer 35. Film layer 32 is laminated over this construction. This method of construction produces capillary channels to wick water at the interface of layers 32 and 33 because of the lack of adhesive at these points. The constructions are then die cut into labels. Since layer 32 is not bonded to layer 33, if label removal is attempted after the label is attached to a substrate, layer 33 will separate from layer 32 and indicate tampering with the label.

Figure 4A:
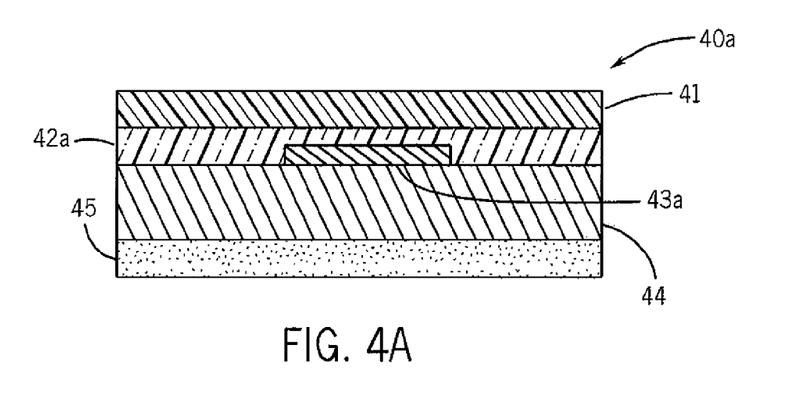
FIG. 4A is a schematic cross-sectional view of a five-layer tamper- and water-indicating label comprising layers of clear film, clear adhesive, printed indicia, absorbent paper and PSA.

FIG. 4A is a schematic cross-sectional view of five-layer tamper- and water-indicating label 40a comprising top film layer 41 overlain on clear PSA layer 42a. The film of layer 41 is typically clear or translucent, about 1 mil thick, and it can be constructed from any material, e.g., polyester. It can be top coated (not shown) for additional printability, and the top coat can comprise any material that is suitable for receiving ink or the like, particularly from a thermal transfer printer. PSA layer 42a is typically 1-3 mils in thickness, and an acrylic PSA is preferred for optical clarity.

Layer 43a comprises printed indicia comprising a water-soluble dye dispersed in an ink binder. Layer 43a is buried within the label, i.e., it is not co-extensive with immediately adjacent layers 42a and 44. This indicia layer overlies absorbent paper layer 44 which in turn overlies PSA layer 45. The PSA layer can be protected with a protective liner (not shown) until it is used to attach the label to an object.

Upon exposure to water, the label absorbs the water through an edge of paper layer 44 which transports the water via wicking or capillary action to water soluble dye/ink layer 43a. The water dissolves the dye, and the solubilized dye bleeds and smears the printed indicia that indicate exposure to water. Positioning the ink layer inward from the edge of the label protects the water-soluble dye from exposure to high levels of humidity.

Figure 4B:
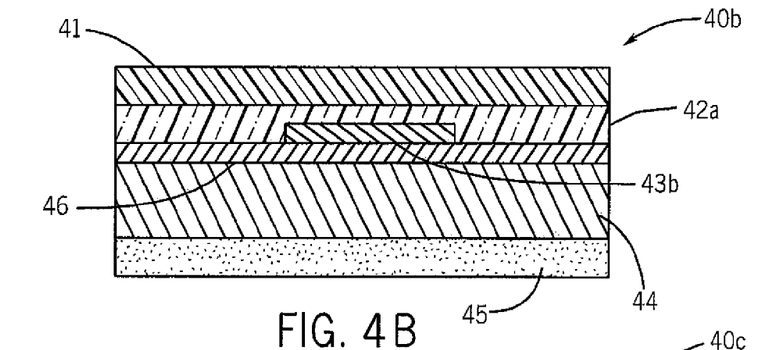
FIG. 4B is a schematic cross-sectional view of a six-layer variation on the label of FIG. 4A.

Several variations exist on the construction of label 40a. One such variation is illustrated by FIG. 4B. Label 40b comprises six layers. Layers 41 and 42a are essentially the same as layers 41 and 42a and 43 in label 40a. Here too layer 41 can optionally be overlain with a clear or translucent printable top coat (not shown). However, while layer 43b comprises a water-soluble dye dispersed in an ink binder (just like layer 43a in label 40a), here the ink binder is pigmented to mask the dispersed dye. As such, the dispersed dye is not visible to the unaided eye without very careful examination. Layer 46 comprises a printed ink that matches the color of layer 43b so that the indicia of layer 46 are not visible. Layers 44 and 45 are essentially the same as layers 44 and 45 of label 40a (including the not shown protective liner).

In this embodiment, water is absorbed through the edge of layer 44, is transported to layer 43b through layer 46, and dissolves the water-soluble dye. The solubilized dye bleeds out to reveal the indicia of layer 43b to indicate exposure to water. Positioning the ink layer inward from the edge of the label protects the water-soluble dye from exposure to high levels of humidity.

Figure 4C:
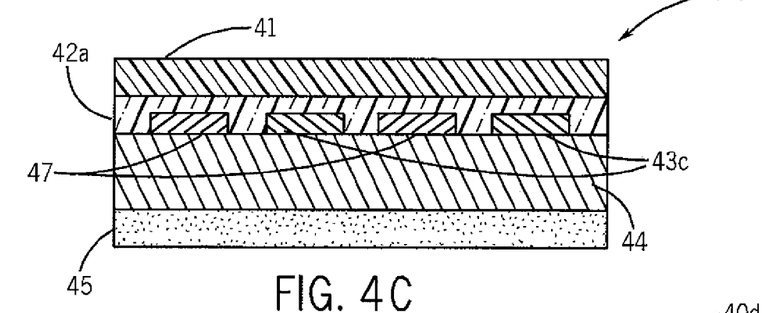
FIG. 4C is a schematic cross-sectional view of another six-layer variation on the label of FIG. 4A

In another variation, label 40c of FIG. 4C comprises five layers of which layers 41 and 42a are essentially the same as layers 41 and 42a labels 40a and 40b. However, while layer 43c comprises a water-soluble dye precursor dispersed in an ink binder (just like layer 43a in label 40a and layer 43b in label 40b), here the ink binder is colorless so that it is not visible to the unaided eye without very careful examination. Moreover, layer 43c is printed in a pattern across layer 44 such that it is not co-extensive with layer 44. Layer 47 is a printed pattern of water soluble dye developer, e.g., a salt, acid or base, laterally or edge adjacent to, as opposed to transversely or facially adjacent to, layer 43c. In other words, layers 43c and 47 are in essentially the same plane relative to adjacent layers 42a and 44. Layers 44 and 45 are essentially the same as layers 44 and 45 of labels 40a and 40b (including the not shown protective liner).

In this embodiment, water is absorbed through the edge of layer 44, is transported to the dye developer of layer 47, transports the developer to layer 43c, and there develops a contrasting color that indicates exposure to water. Since both layers 43c and 47 do not extend to the edges of the label, these layers are protected from exposure to high levels of humidity.

Figure 4D:
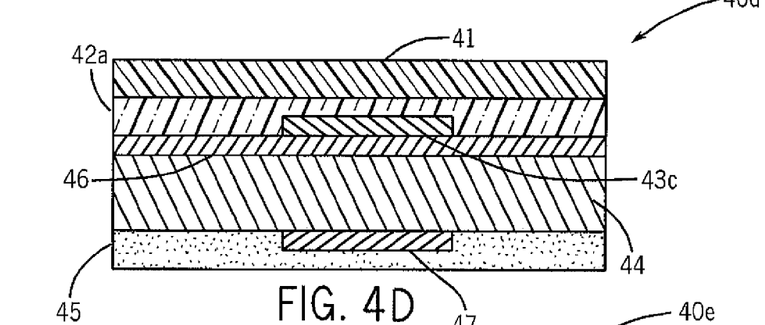
FIG. 4D is a schematic cross-sectional view of a seven-layer variation on the label of FIG. 4A

In another variation, label 40d of FIG. 4D comprises seven layers and closely mimics the construction of label 40c of FIG. 4C. Layers 41, 42a, 44 and 45 are essentially the same in both figures including the optional top coat and protective liner (neither shown). Layer 43c is the same as layer 43c in label 40c, i.e., it comprises a water-soluble dye precursor dispersed in an ink binder, and the ink binder is colorless so that it is not visible to the unaided eye without very careful examination. The principal difference, however, between labels 40c and 40d is the location of layer 47, i.e., the layer that comprises a water soluble dye developer, e.g., a salt, acid or base. In label 50c, this layer lies in the same plane as layer 43c, i.e., between layers 42a and 44. In label 40d, this layer lies beneath layer 43c but separated from layer 43c by layer 44.

In this embodiment, water is absorbed through the edge of layer 44, is transported to the dye developer of layer 47, transports the developer across the thickness of layer 44 to layer 43c, and there develops a contrasting color that indicates exposure to water. Since both layers 43c and 47 do not extend to the edges of the label, these layers are protected from exposure to high levels of humidity.

Figure 4E:
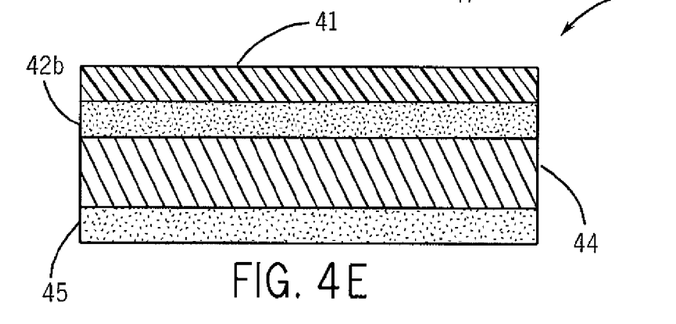
FIG. 4E is a schematic cross-sectional view of a four-layer variation on the label of FIG. 4A.

In another variation, label 40e of FIG. 4E comprises four layers of which layers 41, 44 and 45 are essentially the same as in the preceding figures including the optional top coat and protective liner (neither shown). However, adhesive layer 42b of label 40e is pigmented (unlike adhesive layer 42a in labels 40a-d) and further comprises a water-soluble dye dispersed in the PSA binder. The binder is pigmented to mask the dispersed dye so that it is not visible to the unaided eye without very careful examination. In this embodiment, water is absorbed through the edge of layer 44, and is transported to pigmented PSA layer 42b in which it dissolves the water-soluble dye. The solubilized dye is of a contrasting color to the pigment, and the dye bleeds out of the layer to indicate exposure to water.

Figure 4F:
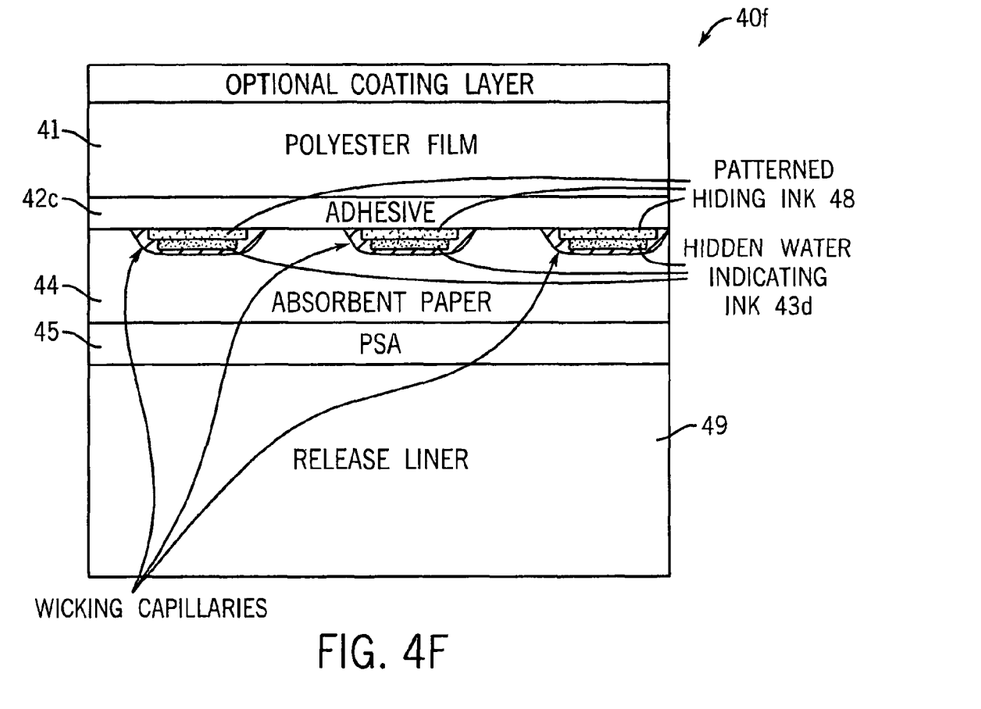
FIG. 4F is a schematic cross-sectional view of a six-layer variation on the label of FIG. 4A.

In another and preferred variation on this embodiment, label 40f of FIG. 4F comprises six layers plus a protective or release liner. Top film layer 41 and adhesive layer 42c are essentially the same as layers 41 and 42a of labels 40a and 40b except that adhesive layer 42c preferably comprises a metallic or, more preferably pearlescent, pigment. Like top film layer 41 of FIG. 4A, top film layer 41 of label 40f can be top coated for additional printability, and the top coat can comprise any material that is suitable for receiving ink or the like.

Sandwiched between adhesive layer 42c and absorbent paper layer 44 are patterned hiding ink 48 and hidden water-indicating ink 43d. Layer 48 is typically and preferably in the form of a pattern that is both positioned inward from the edges of both layers 42c and 44 and contains open areas such that layers 42c and 44 are in maximum contact with one another along the edges. Layer 43d is similar to layers 43a-b of labels 40a-b except that it is constrained within and not fully co-extensive with the borders of layer 48. Pressure sensitive adhesive layer 45 is the same as layer 45 in labels 40a-e, and it is supported by release liner 49.

Layer 41 of label 40f, typically a clear polyester film, is preferably 50 microns thick (0.002") so as to present a smooth, printable surface to a thermal transfer printer. Polyester film that is pretreated for such printability is available commercially, but such film can be manufactured by coating the film with a print coating, such as a thin (1-5 microns) coating of a thermoplastic polyester polymer formulated for this purpose. While the coating can be pigmented to produce desirable appearance properties, such as pearlescence or a metallic look, it may also be left completely transparent. Thinner polyester film can be used, e.g., a thickness of 25 micron, but the print surface may not be sufficiently smooth due to the underlying construction of the label to project optimal appearance and printability.

Layer 42c is an adhesive, preferably a pressure-sensitive acrylic. Acrylic adhesives are inherently clear. This layer is preferably pigmented to obtain a metallic or pearlescent look, as desired. It is also preferably thin (10 to 15 microns). The coating is applied to the polyester film, so that it will not saturate the paper layer below, and to make it available for printing the patterned hiding ink and indicating ink layers.

Patterned hiding ink 48 is printed, preferably in continuous strips to form wicking capillaries between adhesive layer 42c and paper layer 44 beneath. In one variant on this embodiment, UV curable inks printed flexographically form a layer impermeable to the pressure-sensitive adhesive and one or two layers of this ink, colored to closely match the layers beneath (typically gray or white), form this layer and have sufficient opacity to hide the indicating ink (i.e., layer 43d) printed upon (directly under) it. Indicating ink layer 43d is comprised of a water-soluble dye in a binder, such as polyvinyl alcohol. This layer is also printed flexographically directly on the hiding ink layer so that it is not visible through the top of the label. This layer is narrower than the hiding ink layer to allow for modest spreading of the dye in a humid environment while remaining invisible through the top of the label.

Thin, absorbent paper (8 to 16 lb/ream stock, layer 44) is laminated to a pressure-sensitive adhesive (layer 45) that has been coated to a release liner (layer 49). Typically, the adhesive is selected for appropriate adhesion and pigmented with titanium dioxide to give it an opaque, white appearance. Carbon black can be added if a gray appearance is desired, and conductive fillers can be added for static dissipative properties. The liner is chosen for die cutting ease. The adhesive is coated as thin as practicable to obtain appropriate adhesion and opacity, typically 15 to 40 microns. It is coated to the liner and laminated to the paper stock to minimize absorption into the paper stock. The paper stock is laminated in to keep it as open for water wicking as possible. The paper stock is laminated to the printed adhesive side of the top layer forming the capillaries for water absorption. This is then die cut to individual label size.

Figure 4G:
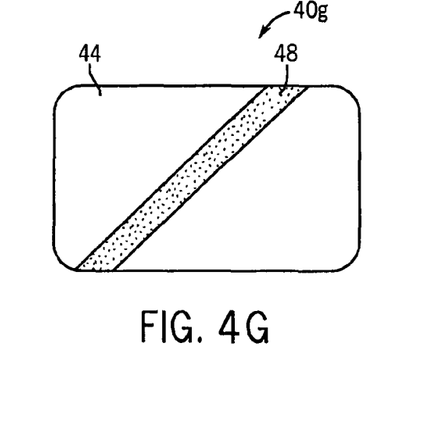
FIG. 4G is a schematic plan view of the patterned hiding ink strip of the label of FIG. 4A supported before the supporting absorbent paper absorbs water.
Figure 4H:
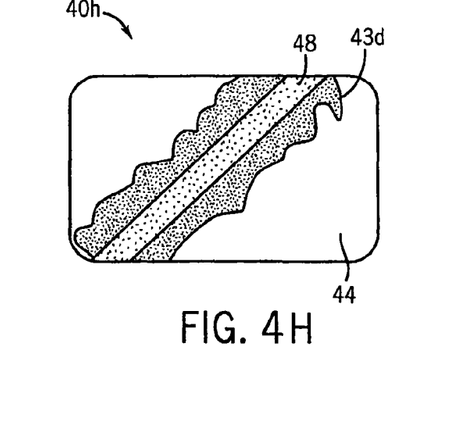
FIG. 4H is the schematic plan view of FIG. 4G after the supporting absorbent paper absorbs water.

Labels made from this construction are printed as desired with text and/or bar code information and applied to the intended device. When exposed to liquid water, water immediately wicks into the open capillaries, solubilizes the water-soluble dye, and then spreads laterally into the paper. In the spaces between the printed capillaries, this dye is visible through the top layer. It is fixed by the paper on drying and remains an indication of this exposure. Even a short exposure (e.g., 5 seconds) can result in a visible indication. Humidity exposure, even at elevated temperatures (e.g., 50° C./95% relative humidity), will not transport the dye beyond the boundaries of the hiding ink layer, while exposure to liquid water rapidly does so. FIGS. 4G and 4H show labels 40g and 40h with a single printed capillary (preferably there arc at least several capillaries within a given label, but one can suffice) both before exposure to water (only a printed stripe shown) and after exposure (the dye has spread out from behind the stripe).

After application of the label to an object, adhesion of the bottom surface of the adhesive layer builds to the object. When adhesion strength exceeds the internal strength of the absorbent paper layer, the label cannot be removed (and re-used) intact. When removal is attempted, the capillaries that are formed also served to function as a patterned release layer. The top polyester film comes off with the printed pattern of ink but between this patterned area, only some of the paper is removed as it splits on peeling. This results in a piece of the top polyester film with a printed ink pattern and bits of paper that have little opacity. If re-use of the label is attempted, then the printed pattern is obvious.

The solvent-indicating property functions in a similar manner. If removal is attempted, then a pattern is left on the object to which the label was adhered, rather than on the label itself. In addition, a combination of these approaches can be used, with capillaries formed on both sides of the paper stock, and a combination mode of removal-indication resulting. From an ease of manufacturing perspective, the capillaries are preferably on top so that printing on an unsupported transfer adhesive is avoided. In addition, removal from the release liner is better facilitated with the capillaries above the absorbent paper, as the paper offers support to the bottom adhesive on peeling from the liner, while if the capillary is between the bottom adhesive and the paper stock, the bottom adhesive is unsupported in the patterned area and can be disrupted on removal from the carrier liner.

While the capillary can be formed by printing inks, and this is a very economical and effective way to produce it, it can also be formed by lamination of a coated film. The film can be coated with an opaque hiding layer and an indicating ink layer, and then laminated in to form these capillaries as well. Laminating strips of film within the construction also results in a less continuous label construction. When strips are laminated in, ridges can be formed in the top polyester film layer, and these can interfere with printing, especially bar codes. In the same manner, the absorbent paper can be laminated in as a narrower strip within a label, however this also represents a discontinuity that is reflected in ridges in the top layer and reduced printing performance.

Figure 5:
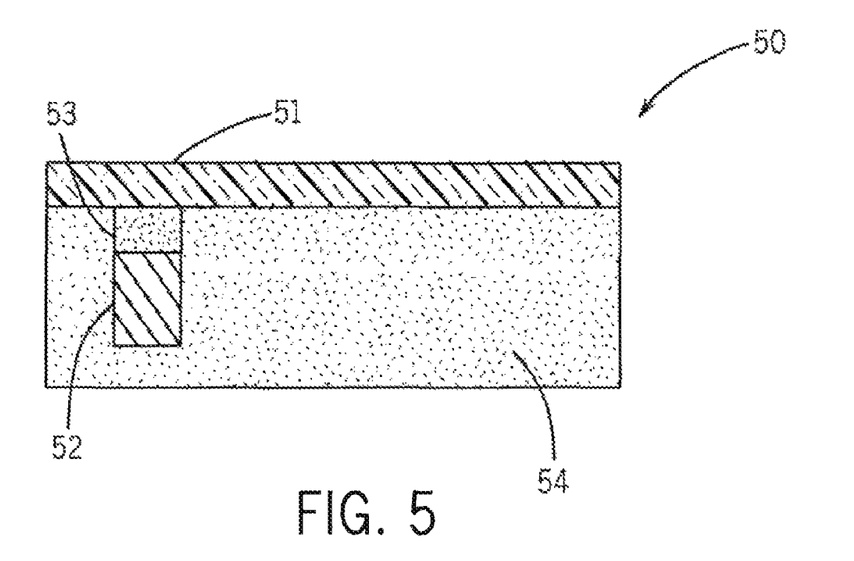
FIG. 5 is schematic cross-sectional view of a tamper- and water-indicating label comprising layers of printable film and a water-indicating strip.

FIG. 5 is a cross-sectional view of label 50. Label 50 comprises clear top layer 51, e.g., a polyester film of 1 mil thickness with an optional top coat (not shown) for additional printability by a printing device such as a thermal transfer printer, to which is laminated pigmented adhesive strip 53 which comprises a water-soluble dye dispersed in a PSA binder. As in earlier-described constructions, the binder is pigmented to mask the dispersed dye so that it is not visible to the unaided eye without very careful examination. Paper strip 52 is laminated to adhesive strip 53 for moisture wicking and transport, and PSA layer 54 is laminated over it and the exposed surface of layer 51.

Figure 6:
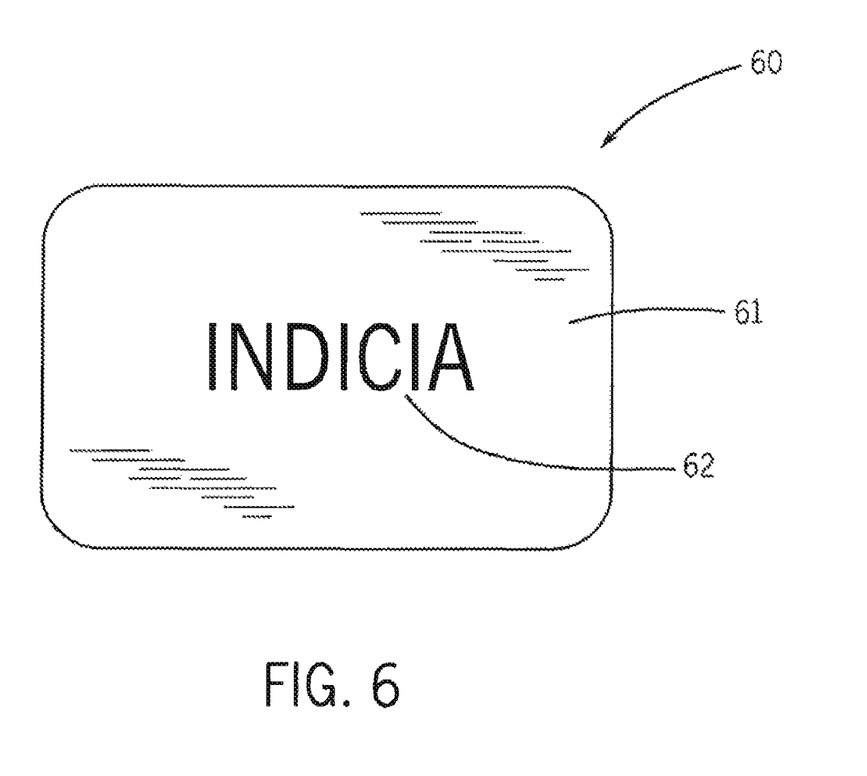
FIG. 6 is a plan view of a tamper- and water-indicating label comprising a printable film carrying water-indicating indicia.

FIG. 6 is a plan view of label 60 comprising printable top layer 61 beneath which is laminated over printed indicia 62 that comprises a water-soluble dye dispersed in an ink binder. The binder is pigmented to mask the dispersed dye so that it is not visible to the unaided eye without very careful examination.

Although the invention has been described in considerable detail by the preceding examples and reference to the drawings, this detail is for the purpose of illustration and is not to be construed as a limitation upon the spirit and scope of the invention as it is described in the appended claims. All U.S. patents, allowed U.S. patent applications and U.S. patent application Publications cited above are incorporated herein by reference.

What is claimed is:

1. An edge ingress, tamper- and water-indicating label comprising (i) an optional printable coating layer which is over and in contact with (ii) a clear film layer which is over and in contact with (iii) an adhesive layer which is over and in contact with (iv) a patterned, hiding ink layer which is over and in contact with (v) a water-soluble, hidden, water-indicating ink layer wherein the water-indicating ink layer is narrower and not fully co-extensive with the hiding ink layer, the hiding ink layer over and in contact with (vi) an absorbent layer which is over and in contact with (vii) a pressure sensitive adhesive layer which is over and in contact with (viii) an optional protective liner, and (ix) wicking capillaries between the adhesive and absorbent layers.

2. The label of claim 1 in which the absorbent layer comprises paper.

3. The label of claim 2 in which adhesive layer (iii) comprises a metallic or pearlescent pigment.

4. The label of claim 3 in which the patterned hiding ink layer is not fully co-extensive with adhesive layer (iii).

5. An electronic device bearing the label of claim 1.

6. The electronic device of claim 5 in the form of a computer, cell phone or personal digital assistant.

7. The label of claim 1 in which the clear film layer is a polyester film.

8. The label of claim 7 in which the optional printable coating layer is present.

9. The label of claim 8 in which the adhesive layer of (iii) comprises a pressure-sensitive acrylic.

* * * * *